United States Patent
Shuvali et al.

(10) Patent No.: US 10,725,891 B2
(45) Date of Patent: *Jul. 28, 2020

(54) EVALUATING USER EXPERIENCE

(71) Applicant: MICRO FOCUS LLC, Santa Clara, CA (US)

(72) Inventors: Haim Shuvali, Yehud (IL); Amichai Nitsan, Yehud (IL); Yirat Hendler, Yehud (IL); Guy Offer, Yehud (IL); Dana Gilboa, Yehud (IL); Alon Berkoviz, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 311 days.

This patent is subject to a terminal disclaimer.

(21) Appl. No.: 15/308,590

(22) PCT Filed: May 30, 2014

(86) PCT No.: PCT/US2014/040392
§ 371 (c)(1),
(2) Date: Nov. 2, 2016

(87) PCT Pub. No.: WO2015/183322
PCT Pub. Date: Dec. 3, 2015

(65) Prior Publication Data
US 2017/0052870 A1 Feb. 23, 2017

(51) Int. Cl.
*G06F 11/36* (2006.01)
*G06F 11/34* (2006.01)
*G06F 11/30* (2006.01)

(52) U.S. Cl.
CPC ......... *G06F 11/366* (2013.01); *G06F 11/302* (2013.01); *G06F 11/3419* (2013.01);
(Continued)

(58) Field of Classification Search
CPC .. G06F 11/366; G06F 11/302; G06F 11/3419; G06F 11/3438
(Continued)

(56) References Cited

U.S. PATENT DOCUMENTS 6,959,265 B1    10/2005  Candela et al.
7,587,324 B2 *   9/2009  Kaiser ............... G06Q 10/0639
                                                379/265.02
(Continued)

FOREIGN PATENT DOCUMENTS

WO   WO-2014040633 A1    3/2014
WO   WO-2015183322 A1   12/2015
WO   WO-2015187156 A1   12/2015

OTHER PUBLICATIONS

Bugsense Inc., "MobDex: Deliver More," (Web Page), Mar. 13, 2014, 2 pages, available at http://blog.bugsense.com/post/45260532382/mobdex-deliver-more#permalink-notes.
(Continued)

*Primary Examiner* — Lewis A Bullock, Jr.
*Assistant Examiner* — Theodore E Hebert (57) ABSTRACT

Evaluating user experience for an application includes collecting, for each of a plurality of sessions of the application, a list of user event data items experienced during that session. The list of user event data items includes any of a device utilization quantifier, user action-response time pairs, and an application fault indicator. For each session, a value is assigned to each collected user event data item, and a session score is derived based on those assigned values. A user experience score is derived based upon a plurality of the derived session scores. The user experience score is reported.

20 Claims, 3 Drawing Sheets

(52) U.S. Cl.
CPC ...... *G06F 11/3438* (2013.01); *G06F 11/3409* (2013.01); *G06F 2201/81* (2013.01); *G06F 2201/86* (2013.01)

(58) Field of Classification Search
USPC .......................................................... 717/124
See application file for complete search history.

(56) References Cited

U.S. PATENT DOCUMENTS

| | | | | |
|---|---|---|---|---|
| 8,117,136 | B2* | 2/2012 | Yang | H04M 1/72522 706/10 |
| 8,335,848 | B2* | 12/2012 | Wenig | G06F 11/3438 709/224 |
| 8,484,730 | B1* | 7/2013 | P. R. | G06F 11/3438 709/225 |
| 8,504,575 | B2* | 8/2013 | Koran | G06Q 30/02 707/748 |
| 8,990,637 | B1* | 3/2015 | Vlachogiannis | G06F 9/542 714/47.1 |
| 9,355,006 | B2* | 5/2016 | Vlachogiannis | G06F 9/542 |
| 10,475,090 | B2* | 11/2019 | Shuvali | G06Q 30/0282 |
| 2001/0044795 | A1 | 11/2001 | Cohen et al. | |
| 2003/0037034 | A1 | 2/2003 | Daniels et al. | |
| 2005/0055357 | A1 | 3/2005 | Campbell | |
| 2005/0188318 | A1* | 8/2005 | Tamir | G06F 11/3438 715/744 |
| 2005/0188423 | A1* | 8/2005 | Motsinger | H04L 63/0876 726/22 |
| 2008/0313650 | A1 | 12/2008 | Arnquist et al. | |
| 2010/0091954 | A1* | 4/2010 | Dayanidhi | G10L 15/01 379/88.04 |
| 2010/0269044 | A1* | 10/2010 | Ivanyi | G06Q 30/02 715/736 |
| 2012/0072570 | A1* | 3/2012 | Jenkins | H04L 67/2823 709/224 |
| 2012/0102101 | A1* | 4/2012 | Wenig | G06F 11/3438 709/203 |
| 2012/0166636 | A1* | 6/2012 | Page | G06F 11/3409 709/224 |
| 2013/0002862 | A1* | 1/2013 | Waring | H04N 7/18 348/143 |
| 2013/0036122 | A1* | 2/2013 | Cohen | G06F 11/3409 707/741 |
| 2015/0324271 | A1* | 11/2015 | Glass | G06F 3/0482 707/706 |
| 2016/0065419 | A1* | 3/2016 | Szilagyi | H04L 41/5067 709/224 |
| 2017/0039200 | A1* | 2/2017 | Galkin | G06F 11/3419 |
| 2017/0052870 | A1* | 2/2017 | Shuvali | G06F 11/302 |
| 2018/0011855 | A1* | 1/2018 | Shuvali | G06Q 30/0282 |

OTHER PUBLICATIONS

Ethnio, Inc., "Remote Usability and UX Research Tools," (Web Page), May 28, 2014, 13 pages, available at https://web.archive.org/web/20140528050334/http:/remoteresear.ch/tools.

Guo, F., "More Than Usability: The Four Elements of User Experience, Part IV," (Web Page), Nov. 25, 2013, 8 pages, available at http://www.uxmatters.com/mt/archives/2013/11/more-than-usability-the-four-elements-of-user-experience-part-iv.php#sthash.R8CVdJpl.dpuf.

Hirschauer, J., "Apdex is Fatally Flawed," (Web Page), Sep. 10, 2013, 5 pages, available at https://blog.appdynamics.com/apm/apdex-is-fatally-flawed/.

International Search Report & Written Opinion received in PCT Application No. PCT/US2014/040392, dated Jan. 20, 2015, 12 pages.

Keynote Systems, Inc., "Press Room: 2013, Obamacare Launch Provides Mission-Critical Lessons for Optimizing Web Sites," (Web Page), 2013, 2 pages, available at http://www.keynote.com/company/press_room/releases_2013/10.15.13.html.

New Relic, Inc., "Apdex: Measuring User Satisfaction," (Web Page), retrieved online Nov. 2, 2016, 7 pages, available at https://docs.newrelic.com/docs/apm/new-relic-apm/apdex/apdex-measuring-user-satisfaction.

New Relic, Inc., "Change Your Apdex Settings," (Web Page), retrieved online Nov. 2, 2016, 6 pages, available at https://docs.newrelic.com/docs/apm/new-relic-apm/apdex/change-your-apdex-settings.

New Relic, Inc., "View Your Apdex Score," (Web Page), retrieved online Nov. 2, 2016, 7 pages, available at https://docs.newrelic.com/docs/apm/new-relic-apm/apdex/view-your-apdex-score.

EPO Extended Europe Search Report; Application 14893818.6/3152672-PCT/US2014040903; dated Dec. 1, 2017; 8 pages.

International Preliminary Report on Patentability received in PCT Application No. PCT/US2014/040392, dated Dec. 15, 2016, 9 pages.

International Preliminary Report on Patentability received in PCT Application No. PCT/US2014/040903, dated Dec. 15, 2016, 8 pages.

International Search Report & Written Opinion dated Jan. 19, 2015, PCT Application No. PCT/US2014/040903, filed Jun. 4, 2014, Korean Intellectual Property Office, 9 pages.

New Relic APM, "Apdex: Measure user satisfaction", retrieved from the Internet on Dec. 6, 2018, 4 pages. <https://docs.newrelic.com/docs/apm/new-relic-apm/apdex/apdex-measure-user-satisfaction>.

* cited by examiner

EVALUATING USER EXPERIENCE

BACKGROUND

Many services are delivered to consumers via software applications. These applications may be composite in that several software components work in conjunction to realize the service. Those components may be distributed across various physical and virtual devices. A client side user interface component may be presented by a smartphone, laptop or other user computing device. Through that user interface component, a user can each initiate a series of actions carried out by the user computing device and by server side components in an attempt to achieve a desired goal. A user's experience with an application can be effected by numerous factors such as usability, stability, performance and availability of its various components.

DETAILED DESCRIPTION

Introduction

User experience, commonly abbreviated as UX, involves a person's behaviors, attitudes, and emotions about using a particular software product. While subjective in nature, user experience for a software product can, as explained in more detail below, be quantified by evaluating differences to between events expected and those actually experienced when using the application. Events can include response times for different types of user actions, application faults, and consumption levels of user device resources. Improving user experience of an application can lead to improved adoption of the application, increased retention of application users, and increased productivity for those users.

Various embodiments described below can be used to quantify and evaluate user experience of an application. Within an application session, user event data items are collected. User event data items are discrete pieces of information that are reflective of an event experienced by a user in a given application session. An event is an application event and can include a response time to a user initiated request, an application fault, and a device utilization quantifier. Device utilization quantifiers reflect battery depletion amounts or rates, network bandwidth usage, and memory and processor consumption. Values are assigned to each of these data items. Using these values, a user efficiency score is derived for the application, session scores are derived for each session, and event scores are derived for each type of event. The scores can be reported for use in objectively measuring the user experience for the application and identifying steps for improving user experience.

Components

Figure 1:
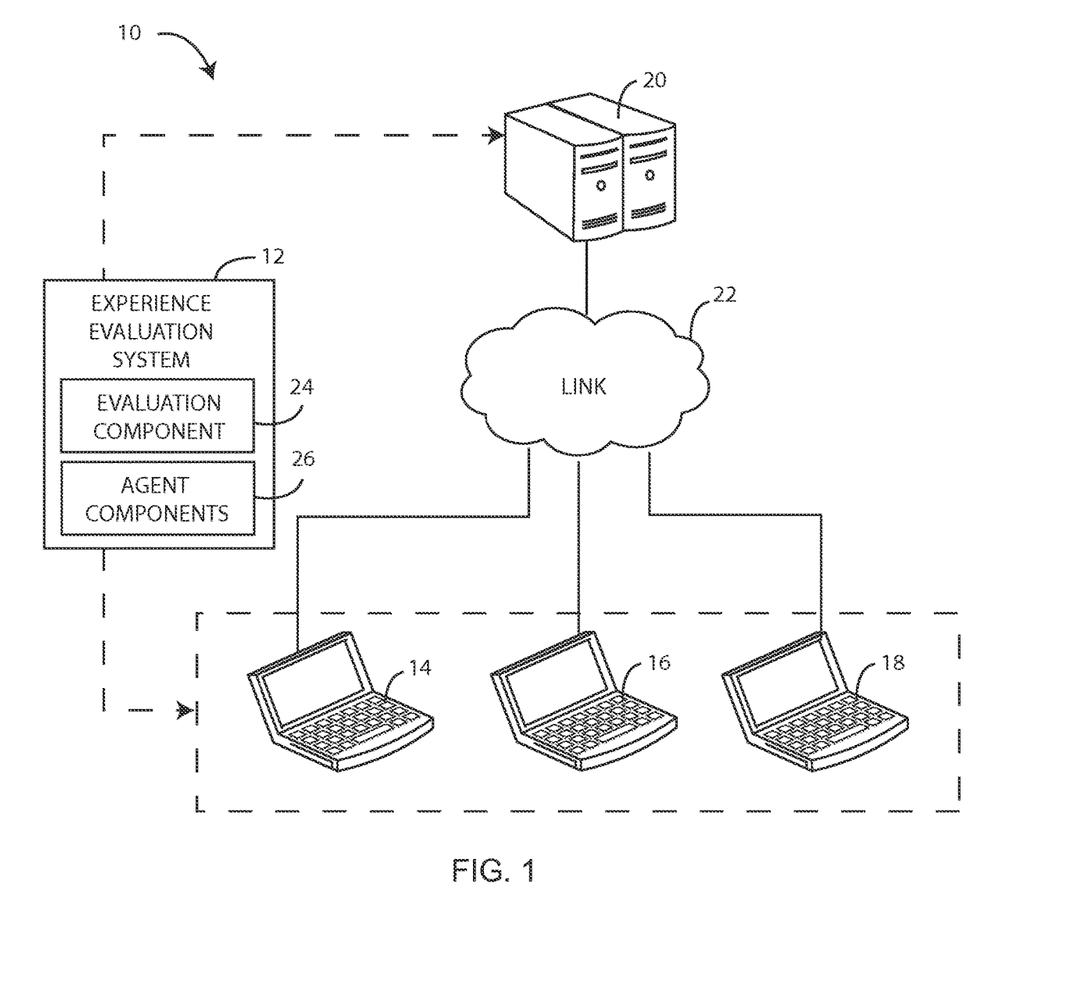
FIG. 1 is a block diagram depicting an example environment in which various embodiments may be implemented.

FIG. 1 depicts an example environment 10 in which embodiments may be implemented as experience evaluation system 12. Environment 10 is shown to include user devices 14-18 and server device 20. Each user device 14-18 represents a computing device configured to communicate requests to and receive responses from server device 20. Server device 20 represents a computing device capable of receiving and responding to requests from client devices 14-18. While depicted as laptop computers, user devices 14-18 can include any type of computing device providing a user interface through which a user can interact with a software application. While server device 20 is depicted as a single computing device, server device 20 may include any number of integrated or distributed computing devices serving one or more software applications for consumption by user devices 14-18. Components 14-20 are interconnected via link 22. Link 22 represents generally any infrastructure or combination of infrastructures configured to enable electronic communication between components 14-20. For example, link 22 may represent the internet, one or more intranets, and any intermediate routers, switches, and other interfaces.

Server device 20 serves an application for consumption by user devices 14-20. Users interact with that application via a user interfaces of user devices 14-20. Through the user interfaces, those users can take a number of actions including starting or opening an application session and interacting with user interface controls. Application events occur as a result of those user actions. Events can include responses or results of such actions such user interface updates or changes in response to a selection of a control, device resource consumption, and application faults.

Experience evaluation system 12, discussed in more detail below, represents a combination of hardware and programming configured to quantify a user experience based on application events occurring during application sessions with respect to user devices 14-18. In doing so, system 12, collects user event data items from user devices 14-18. Each collected item may be associated with a corresponding session of an application served by server device 20. Each such session can be associated application environment characteristics such as a particular user, a particular user device, a user device location, an operating system, and an application version.

User event data items can include device utilization quantifiers, application fault indicators, and user action-response time pairs. A device utilization quantifier represents a quantity or rate at which a device resource is being or has been consumed. A device utilization quantifier may also identify or otherwise indicate a user action associated with the consumption. For example, an interaction with a particular control or user interface screen may be associated with a corresponding rate of battery, memory, CPU, or network bandwidth consumption. Application fault indicators represent application faults and may also identify or otherwise indicate a user action associated with the fault. A fault might be fatal such as an application crash or non-fatal such as a recoverable error. User action-response time pairs represent user actions with respect to the applications user interface and a corresponding response time. The pair may identify a particular control selected by a user. Such can include a link, a command button, a radio button, a text box, or any other object with which a user may interact. The response time is a time delay between when a user interacts with a user interface and when the user experiences an expected response.

System 12 can then assign values to each collected user event data item and then derive a number of scores quantifying user experience. The value assigned to a given use event data item is dependent on the nature of that data item and its deviation from user expectations. For example a value assigned to a fatal application error will be much different than a value assigned to a response time that took slightly longer than expected.

The derived scores can include a user experience score, session scores, and event scores. An application is determined as function of all user event data items collected across all application sessions. Session scores are each determined based upon values assigned to user event data items experienced during a corresponding session. The collected user event data items can be separated into event types so that event scores can be determined based on values assigned to user vent data items that fall under a given event type. An event type, for example, might include an application fault associated with a particular user interface control, a response time associated with a user interaction with a given user interface control, or a network bandwidth consumption level associated with a user selection of a given user interface control.

System 12 may be integrated entirely in server device 20 or distributed across server devices not shown. System 12 may be distributed across server device 20 and client devices 14-18. For example, system 26 may include an agent components operating on client devices 14-18 (or other devices not shown) and an evaluation component operating on server device 20 (or another device not shown). In this distributed model, the agent component 26 is responsible for reporting user event data items to evaluation component 24 which in turn is responsible for processing those data items to derive application, session, and event scores.

Figure 2:
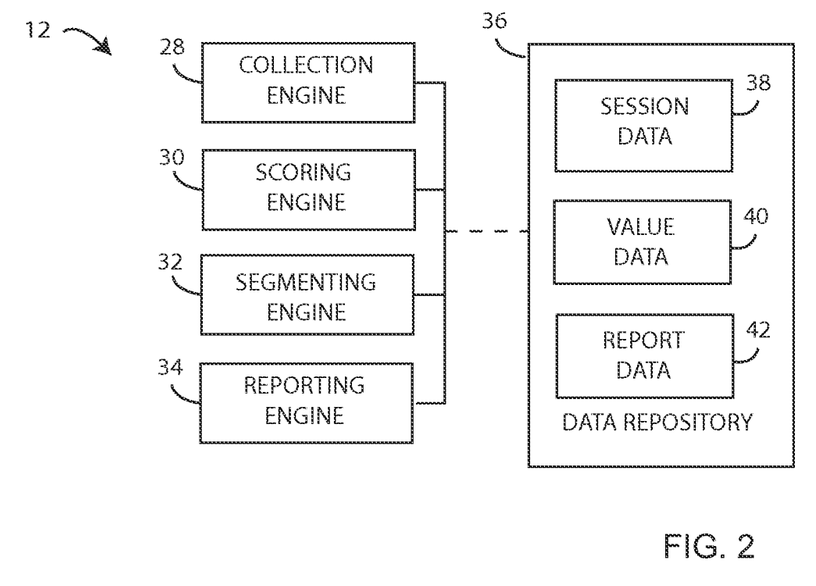
FIG. 2 is a block diagram depicting an example of a system for identifying a common user flow.
Figure 3:
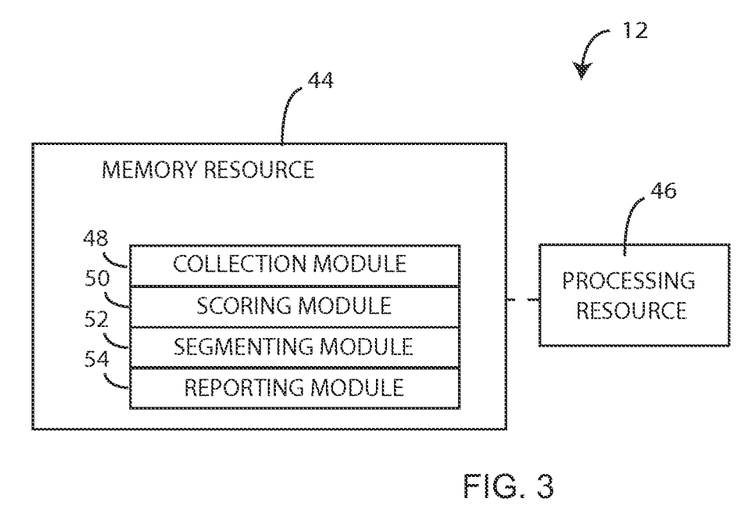
FIG. 3 is a block diagram depicting a memory resource and a processing resource according to an example.

FIGS. 2-3 depict examples of physical and logical components for implementing various embodiments. In FIG. 3 various components are identified as engines 28-34. In describing engines 28-34, focus is on each engine's designated function. However, the term engine, as used herein, refers to a combination of hardware and programming configured to perform a designated function. As is illustrated later with respect to FIG. 4, the hardware of each engine, for example, may include one or both of a processing resource and a memory resource, while the programing is code stored on that memory resource and executable by the processing resource to perform the designated function.

FIG. 2 is a block diagram depicting components of experience evaluation system 12. In this example, system 12 includes collection engine 28, scoring engine 30, evaluation engine 32 and reporting engine 34. In performing their respective functions, engines 28-34 may access data repository 36. Repository 36 represents generally any memory accessible to system 12 that can be used to store and retrieve data.

Collection engine 28 is configured to collect a plurality of user event data items experienced by each of a plurality of application sessions. In an example an agent component 26 operating on a user device detects the initiation of an application session and each of a series of user event data items experienced during that session. The agent component 26 may deem a session to be ended when the application is closed or moved to the background of the user device for more than a threshold period. The application component 26 reports those user event data items to the server component 24. The reporting may be completed as a batch at the end of the session or as a stream occurring during the session. The reporting can include other items such as a session duration and application environment characteristics such as user identifier, device identifier, device location, operating system, and application version.

Scoring engine 30 is configured to assign a value to each of the plurality of user event data items and to derive one or more scores as a function of those assigned values. In assigning values, scoring engine 30 may consider the type of user event data item and its content. For an application fault, that content may identify a fault type and a user action such as the interaction with a particular user interface control that led to the device fault. For a device utilization quantifier, that content may identify any of a particular device resource, a level or rate consumption, and a user action such as the interaction with a particular user interface control that led to the resource consumption. For a user action-response time pair, the content may identify a response time a user action such as the interaction with a particular user interface control and a corresponding response time. That response time may be a measure of time between when a user initiated the action and when the user interface is updated to reflect a completed response to that action.

Thus the value assigned to a user action response time pair may depend upon a difference between the pair's response time and an expected response time or other threshold. The expected response time may be dependent upon the particular user action. For example an expected response time for selecting a radio button can be less than the expected response time for selecting a submit button. The value assigned to an application fault may depend on whether or not the fault was fatal and upon the particular user action or actions that led to the fault. The value assigned to a device utilization quantifier may depend upon the resource being consumed and the rate or quantity consumed. The user event data items may be collected in time ordered sequences for each session. The position of a given user event data item in the sequence may also affect the value assigned to that item. For example, a lengthy response time at the end of the sequence may affect the score differently than the same response time had it occurred at the beginning of the sequence.

Moreover, any given value assigned to a given user event data item may also be dependent on length of the session in which that data item is experienced. For example, the value assigned to the data item occurring in a shorter session may be different than the value assigned to the same data item had it been experienced in a longer session. Where the value represents a penalty, the value assigned for the shorter session may exceed the value assigned for the longer session.

In deriving scores, scoring engine 30 can derive a user experience score, session scores, and event scores. The user experience score is derived as a function of the values assigned to each of the collected user event data items and serves to quantify the overall user experience for the application. For example, where those values reflect penalties for negative experiences, the value may be deducted from a constant such as 100. Where values indicates positive experiences, they may be added. The resulting score then quantifies the overall user experience for the application.

A session score is derived from the values assigned to user event data items experienced for a corresponding session and serves to quantify a user experience for a given session. Segmenting engine 30 is configured to segment the collected user event data items into subsets each falling under a given event type. An event type, for example, might include an application fault associated with a particular user interface control, a response time associated with a user interaction with a given user interface control, or a network bandwidth consumption level associated with a user selection of a given user interface control. An event score is then derived from values assigned to those user event data items that fall under a corresponding event type and quantifies a user experience for a that event type. In deriving session and event type scores, scoring engine 30 may sum the corresponding values.

Collected user event data items and assigned values can be stored as session data 38. Session data 38 may include data items and scores for each of a plurality of sessions for a given application. For a given session, the data may be represented by a time ordered sequence of user event data items and associated values. Session data 38 can also include additional information that can identify any of a session duration, user, a user device, a device location, an operating system, and an application version associated with each given session. The data may also identify a duration of each session.

Value data 40 represents data for use by scoring engine 30 to assign values to user event data items. For example, value data can include expected response times for different types of user event-response time pairs. For each expected time, value data 40 might also include a series of thresholds indicative of whether a response time is short, long, very long, or the like. The thresholds may be used to discern an appropriate valued to assign to a matching user event-response time pair. Value data 40 may also include fixed values to assign to different application faults and different rates of resource consumption. Value data 40 may include multipliers for use in adjusting a value based on when a user event data item was experienced during a session and for adjusting a value based on that session's duration. Beneficially, value data 40 can be tuned to a given application to match changing expectations of users.

Reporting engine 34 is configured to report scores derived by scoring engine 32. Scoring engine 30 may store those scores as report data 42 for use by reporting engine 34. Reporting can include communicating a user experience score, session scores and event scores an electronic message. Reporting can include posing the scores to a repository where they can be processed to assemble a human readable report such as a dashboard. In communicating a user experience score, reporting engine 34 may also report a list of event scores prioritized based on their impact on the user experience score. For example, where values assigned to user event data items reflect penalties, an event score for a given event type may reflect a sum of those penalties assigned to data items falling under that event type. Thus the greater the event score's magnitude, the greater impact on the user experience score.

As noted, user event data items for each session may be collected along with application environment indicators. These indicators can include at least one: two or more different user devices, two or more different user locations, two or more different operating systems, and two or more different versions of the application. In this example, reporting engine 32 is then configured to report the session scores to provide a comparison between two or more selected application environments. Such could include a comparison of average session scores between two application versions, between two device locations, between two operating systems, or between two user types.

With reference back to FIG. 1, collection engine 28 can be implemented in a number of fashions. Collection engine 28 may be implemented as a client side agent component 26 that reports the user event data items, a server side evaluation component 24 that receives the user event data items, or a combination of the two. Scoring engine 30 may be implemented in part as a client side agent component 26 that assigns values to user event data items and as a server side evaluation component 24 that derives scores. Scoring engine 30 may be implemented entirely as a server side evaluation component 24. Segmenting engine 32 and reporting engine 34 may be implemented as either or both as client side agent components 26 or server side evaluation components 24.

In the foregoing discussion, engines 28-34 were described as combinations of hardware and programming. Engines 38-34 may be implemented in a number of fashions. Looking at FIG. 3, the programming may be processor executable instructions stored on tangible memory resource 44 and the hardware may include processing resource 46 for executing those instructions. Thus memory resource 44 can be said to store program instructions or code that when executed by processing resource 46 implements system 12 of FIG. 2.

Memory resource 44 represents generally any number of memory components capable of storing instructions that can be executed by processing resource 46. Memory resource 44 is non-transitory in the sense that it does not encompass a transitory signal but instead is made up of more or more memory components configured to store the relevant instructions. Memory resource 44 may be implemented in a single device or distributed across devices. Likewise, processing resource 46 represents any number of processors capable of executing instructions stored by memory resource 44. Processing resource 46 may be integrated in a single device or distributed across devices. Further, memory resource 44 may be fully or partially integrated in the same device as processing resource 46, or it may be separate but accessible to that device and processing resource 46.

In one example, the program instructions can be part of an installation package that when installed can be executed by processing resource 46 to implement system 12. In this case, memory resource 44 may be a portable medium such as a CD, DVD, or flash drive or a memory maintained by a server from which the installation package can be downloaded and installed. In another example, the program instructions may be part of an application or applications already installed. Here, memory resource 44 can include integrated memory such as a hard drive, solid state drive, or the like.

In FIG. 3, the executable program instructions stored in memory resource 44 are depicted as collection, scoring, segmenting, and reporting modules 48-54 respectively. Modules 48-54 represent program instructions that, when executed, cause processing resource 46 to implement engines 28-34 respectively.

Operation

Figure 4:
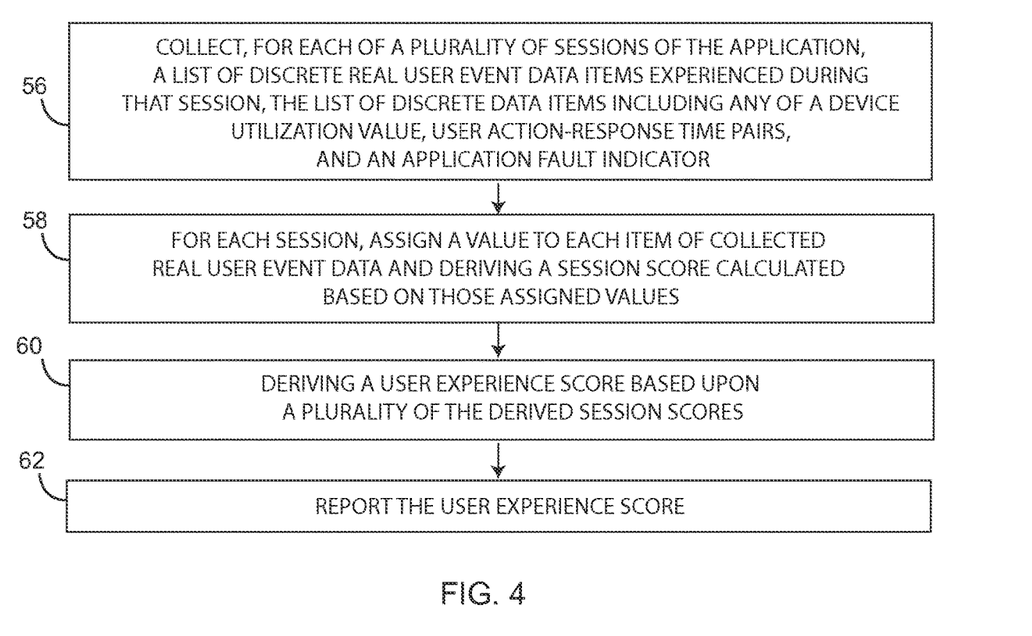
FIG. 4 is a flow diagram depicting actions taken to implement an example.

FIG. 4 is a flow diagram of actions taken to implement a method for evaluating user experience for an application. In discussing FIG. 4, reference may be made to components depicted in FIGS. 1-3. Such reference is made to provide contextual examples and not to limit the manner in which the method depicted by FIG. 4 may be implemented.

For each of a plurality of sessions of the application, a list of user event data items experienced during that session is collected (block 56). The list of user event data items includes any of a device utilization quantifier, user action-response time pairs, and an application fault indicator. Referring to FIG. 2, collection engine may be responsible for block 56.

For each session, a value to each collected user event data item and a session score derived based on those assigned values (block 58). Assigning in block 58 can include assigning a value to a collected user action-response time pair that is dependent upon an extent to which the response time reflected in the pair exceeds a threshold time associated with the user action reflected in the pair. Assigning, in block 58, can include assigning a value to a collected user action-response time pair that is a function of the response time reflected in the pair an expected time associated with the user action reflected in the pair and a duration of the session in which the user event-response time pair wars experienced.

Collecting, in step 56, can include, for each of the plurality of sessions, collecting a time ordered list of user event data items experienced during that session. Assigning, in step 58 an then include assigning a value to a user event data item that is a function of the time based position of that user event data item in the collected list of user event data items experienced during that session.

A user experience score based upon a plurality of the derived session scores (block 60). Referring to FIG. 2, scoring engine 30 may be responsible for blocks 58 and 60. The user experience score is then reported (block 62). Reporting engine 34 of FIG. 2 may be responsible for block 62.

The method depicted in FIG. 4 can also include identifying, from the collected lists of list of user event data items experienced during the plurality of sessions, a plurality of distinct event types each representing a different subset of user event data items. Block 60 can then also include deriving, for each distinct event type, an event score that is a function of the values assigned to the user event data items represented by that event type. Reporting, in block 62, can then also include reporting a prioritized list of event types affecting the user experience score, the list being prioritized according to the derived event scores.

Block 62 can also include reporting the session scores. Where collecting in block 56, includes collecting session characteristics such as session duration and application environment indicators such as user identifiers, device identifiers, device locations, operating systems, and application versions, reporting in step 62 can be more finely tuned. For example, block 60 may include deriving a user experience score based only on session scores corresponding to particular device locations, user types, device topes, operating systems, or application versions. Likewise, block 62 can include reporting a comparison of average session scores between application versions or device locations.

CONCLUSION

FIGS. 1-3 aid in depicting the architecture, functionality, and operation of various embodiments. In particular, FIGS. 1-3 depict various physical and logical components. Various components are defined at least in part as programs or programming. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Embodiments can be realized in any memory resource for use by or in connection with processing resource. A "processing resource" is an instruction execution system such as a computer/processor based system or an ASIC (Application Specific Integrated Circuit) or other system that can fetch or obtain instructions and data from computer-readable media and execute the instructions contained therein. A "memory resource" is any non-transitory storage media that can contain, store, or maintain programs and data for use by or in connection with the instruction execution system. The term "non-transitory is used only to clarify that the term media, as used herein, does not encompass a signal. Thus, the memory resource can comprise any one of many physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory, flash drives, and portable compact discs.

Although the flow diagram of FIG. 4 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A method for evaluating user experience for an application, comprising:
   collecting, for each of a plurality of sessions of the application, a list of user event data items experienced during each of the plurality of sessions; and
   for each session,
      identifying a plurality of distinct event types, wherein the plurality of distinct event types include an application fault associated with a user interface control;
      segmenting each collected user event data item into one or more of the plurality of distinct event types;
      assigning a value to each collected user event data item, including:
         determining a preliminary value for each collected user event data item based on a length of a session in which each collected user event data item is experienced and based on when each collected user event data item is experienced in the session; and
         applying a multiplier to the preliminary value for each collected user event data item to determine the assigned value for each collected user event data item, wherein the multiplier is based on user expectations that are specific to the application versus other applications;
      deriving an event score for each of the plurality of distinct event types, wherein each derived event score is determined as a function of the value assigned to each collected user event data item segmented under the distinct event type for the derived event score; and
      deriving a session score calculated based on the values to each collected user event data item;
   deriving a user experience score based upon a plurality of derived session scores;
   reporting the derived user experience score and a list of derived event scores prioritized based on their impact on the derived user experience score; and
   improving the application for a user based on the prioritized derived event scores.

2. The method of claim 1, wherein assigning the value to each collected user event data item further comprises assigning a value to a collected user action-response time pair that is dependent upon an extent to which a response time reflected in the collected user action-response time pair exceeds a threshold time associated with a user action reflected in the collected user action-response time pair.

3. The method of claim 1, wherein assigning the value to each collected user event data item further comprises assigning a value to a collected user action-response time pair that is a function of a response time reflected in the collected user action-response time pair, an expected time associated with a user action reflected in the collected user action-response time pair and a duration of that session.

4. The method of claim 1, wherein:
collecting the list of user event data items comprises collecting, for each of the plurality of sessions, a time ordered list of user event data items experienced during each session; and
for any of the plurality of sessions, assigning the value to each collected user event data item comprises assigning a value to at least one of the user event data items that is a function of a time based position of that user event data item in the collected list of user event data items experienced during that session.

5. The method of claim 1, wherein reporting comprises reporting a prioritized list of the plurality of distinct event types affecting the derived user experience score, the list of the plurality of distinct event types prioritized according to the derived event scores.

6. The method of claim 1, wherein the collected user event data items include a device utilization quantifier, a user action-response time pair, and an application fault indicator.

7. The method of claim 1, wherein each derived event score is a function of an average of values assigned to each of the collected user event data items represented by a distinct event type.

8. A memory resource storing instructions that when executed cause a processing resource to implement a system evaluating user experience for an application, the instructions comprising:
a collection module that when executed causes the processing resource to collect user event data items experienced during each of a plurality of sessions initiated from a plurality of different user devices;
a segmenting module that when executed causes the processing resource to:
identify a plurality of distinct event types; and
segment the collected user event data items into one or more of the plurality of distinct event types;
a scoring module that when executed causes the processing resource to:
assign values to the collected user event data items, wherein to assign the values to the collected user event data items the processing resource is further to:
determine a preliminary value for each of the collected user event data items based on a length of a session in which each user event data item is experienced and based on when each user event data item is experienced in the session; and
apply a multiplier to the preliminary value for each collected user event data items to determine the assigned value for the collected user event data item, wherein the multiplier is based on user expectations that are specific to the application versus other applications;
derive a user experience score as a function of the values assigned to the collected user event data items; and
derive an event score for each of the plurality of the distinct event types, wherein each derived event score is derived as a function of the value assigned to each collected user event data item segmented under that distinct event type for the derived event score;
a reporting module that when executed causes the processing resource to report the derived user experience score and a list of the derived event scores prioritized based on their impact on the derived user experience score; and
improve the application for a user based on the prioritized derived event scores.

9. The memory resource of claim 8, wherein:
the collection module, when executed, causes the processing resource to collect the user event data items by collecting, for each session of the plurality of sessions, a time ordered list of user event data items experienced for that session;
the scoring module, when executed, causes the processing resource to assign the values to the collected user event data items by, for each session of the plurality of sessions, assigning, to at least one user event data item for that session, a value that is dependent upon a position of that at least one user event data item in the collected list of time ordered list of user event data items for that session.

10. The memory resource of claim 8, wherein:
the collected user event data items include a plurality of user action-response time pairs; and
the scoring module, when executed, causes the processing resource to assign the values to the collected user event data items by assigning, to the each of the plurality of user action-response time pairs, a value that is dependent upon a response time reflected in that user action-response time pair and at least one of an extent to which that response time exceeds a threshold time, an expected time associated with a user action reflected in that user action-response time pair, and a duration of an application session in which that user action-response time pair was experienced.

11. The memory resource of claim 10, wherein the scoring module, when executed, causes the processing resource to assign each values by assigning, to each of the plurality of collected user action-response time pairs, a value that is dependent upon a response time reflected in each user action-response time pair.

12. The memory resource of claim 8, wherein the collected user event data items include a device utilization quantifier, a user action-response time pair, and an application fault indicator.

13. The memory resource of claim 8:
wherein the segmenting module, when executed, causes the processing resource to identify a count for each of the plurality of distinct event type, the count for each of the plurality of distinct event types reflecting a number of collected user event data items represented by that distinct event type; and
wherein the reporting module, when executed, causes the processing resource to report a prioritized list of the plurality of distinct event types, the prioritized list being prioritized according to the count for each of the plurality of distinct event types.

14. The memory resource of claim 13, wherein the derived event scores are an average of the values assigned to the collected user event data items for one of the plurality of distinct event types and a count for the one of the plurality of distinct event types.

15. A system for evaluating user interface efficiency for an application, the system comprising:
   a processor; and
   a non-transitory computer readable medium storing machine readable instructions, wherein the processor executes the machine readable instructions to:
   identify a plurality of distinct event types, wherein the plurality of distinct event types includes a response time associated with a user interaction and a network bandwidth consumption level associated with a user selection;
   collect a plurality of user event data items by collecting, for each of a plurality of application sessions, user event data items experienced during that application session;
   segment the plurality of user event data items into one or more of the plurality of distinct event types;
   assign a value to each of the plurality of user event data items, wherein to assign the value to each of the plurality of user event data items, the processor further executes the machine readable instructions to:
      determine a preliminary value for each of the plurality of collected user event data items based on a length of a session in which each of the plurality of user event data items is experienced and based on when each of the plurality of user event data items is experienced in that session; and
      apply a multiplier to the preliminary value for each of the plurality of user event data items to determine the assigned value for each of the plurality of user event data items, wherein the multiplier is based on user expectations that are specific to the application versus other applications;
   derive, for each of the plurality of distinct event types, an event score as a function of the values assigned to each of the plurality of user event data items represented by that event type;
   derive a user experience score as a function of the values assigned to each of the plurality of user event data items;
   report the derived user experience score, a list of derived event scores prioritized based on their impact on the derived user experience score, and a prioritized list of distinct event types of the plurality of distinct event types affecting the derived user experience score, the prioritized list of distinct event types being prioritized according to the derived event scores; and
   improve the application for a user based on the prioritized derived event scores.

16. The system of claim 15, wherein the processor executes the machine readable instructions to:
   derive, for each of the plurality of application sessions, a session score as a function of the values assigned to the plurality of user event data items experienced during that application session; and
   report the derived session scores.

17. The system of claim 16, wherein the plurality of application sessions are associated with at least a plurality of different application environments including at least one of: two or more different user devices, two or more different user locations, two or more different operating systems, and two or more different versions of the application; and wherein the processor executes the machine readable instructions to report the derived session scores to provide a comparison between two or more selected ones of the plurality of different application environments.

18. The system of claim 15, wherein the plurality of user event data items include device utilization quantifiers, user action-response time pairs, and an application fault indicators, and wherein the processor executes the machine readable instructions to:
   assign values to the device utilization quantifiers that are functions of a rate or quantity of utilization;
   assign values to the user action-response time pairs that are functions of responses times and threshold times associated with user actions reflected in the user action-response time pairs; and
   assign values to the application fault indicators that are dependent upon user actions associated with the fault indicators.

19. The system of claim 15, wherein the plurality of user event data items includes a time ordered list of the plurality of user event data items experienced during an application session of the plurality of application sessions and wherein the processor executes the machine readable instructions to assign the values to each of the plurality of user event data items by assigning to at least one of the plurality of user event data items in the time ordered list a value that is dependent upon a position of that at least one user event data item in the time ordered list.

20. The system of claim 15, wherein each derived event score is a function of an average of the values assigned to the plurality of user event data items represented by that distinct event type corresponding to the derived event score.

* * * * *